US009124093B2

(12) United States Patent
Jones et al.

(10) Patent No.: US 9,124,093 B2
(45) Date of Patent: Sep. 1, 2015

(54) RAIL SURGE VOLTAGE PROTECTOR WITH FAIL DISCONNECT

(71) Applicant: Transtector Systems, Inc., Hayden, ID (US)

(72) Inventors: Jonathan L. Jones, Carson City, NV (US); Chris Penwell, Minden, NV (US)

(73) Assignee: Transtector Systems, Inc., Hayden, ID (US)

( * ) Notice: Subject to any disclaimer, the term of this patent is extended or adjusted under 35 U.S.C. 154(b) by 213 days.

(21) Appl. No.: 14/034,354

(22) Filed: Sep. 23, 2013

(65) Prior Publication Data
US 2014/0085096 A1 Mar. 27, 2014

Related U.S. Application Data

(60) Provisional application No. 61/704,198, filed on Sep. 21, 2012.

(51) Int. Cl.
*G08B 21/00* (2006.01)
*H02H 3/20* (2006.01)

(52) U.S. Cl.
CPC .................................... *H02H 3/20* (2013.01)

(58) Field of Classification Search
CPC ....... H02H 3/20; H02H 7/1213; H02H 9/005; H02H 9/044; H02M 1/32; H02M 1/34; H02M 2001/348; H02M 3/158; H02M 3/335; H02M 3/3387; H02M 7/53862; H03H 1/00; H03H 7/01; H03K 17/0822; H03K 17/0828
See application file for complete search history.

(56) References Cited

U.S. PATENT DOCUMENTS

| 2,030,179 | A | 2/1936 | Potter |
| 3,167,729 | A | 1/1965 | Hall |
| 3,323,083 | A | 5/1967 | Ziegler |
| 3,596,165 | A | 7/1971 | Andrews |
| 3,619,721 | A | 11/1971 | Westendorp |
| 3,663,901 | A | 5/1972 | Forney, Jr. |
| 3,731,234 | A | 5/1973 | Collins |
| 3,750,053 | A | 7/1973 | LeDonne |
| 3,783,178 | A | 1/1974 | Philibert |
| 3,831,110 | A | 8/1974 | Eastman |
| 3,832,627 | A | 8/1974 | Ohsawa |
| 3,845,358 | A | 10/1974 | Anderson et al. |
| 3,921,015 | A | 11/1975 | Obeda et al. |
| 3,944,937 | A | 3/1976 | Fujisawa et al. |

(Continued)

FOREIGN PATENT DOCUMENTS

| CH | 675933 | 11/1990 |
| JP | 08-066037 | 3/1996 |

(Continued)

*Primary Examiner* — Kerri McNally
*Assistant Examiner* — Renee Dorsey
(74) *Attorney, Agent, or Firm* — Snell & Wilmer LLP

(57) ABSTRACT

A surge protector for use with a two line signal path or control circuit. The surge protector has two terminals for connecting to both line signals as well as provisions for earth grounding. The surge protector has a surge protection stage and a short detection stage for detecting imbalances in the signal. The surge protector also includes a trigger stage which activates an electromechanical device to disconnect the two terminals from the rest of the surge protector when the short detection stage detects a short. The surge protector further includes visual indicators for indicating an operating status and a short detection.

20 Claims, 16 Drawing Sheets

(56) References Cited

U.S. PATENT DOCUMENTS

| | | | |
|---|---|---|---|
| 3,956,717 A | 5/1976 | Fisher et al. |
| 3,980,976 A | 9/1976 | Tadama et al. |
| 4,021,759 A | 5/1977 | Camp |
| 4,046,451 A | 9/1977 | Juds et al. |
| 4,047,120 A | 9/1977 | Lord et al. |
| 4,112,395 A | 9/1978 | Seward |
| 4,262,317 A | 4/1981 | Baumbach |
| 4,359,764 A | 11/1982 | Block |
| 4,384,331 A | 5/1983 | Fukuhara et al. |
| 4,409,637 A | 10/1983 | Block |
| 4,481,641 A | 11/1984 | Gable et al. |
| 4,554,608 A | 11/1985 | Block |
| 4,563,720 A | 1/1986 | Clark |
| 4,586,104 A | 4/1986 | Standler |
| 4,689,713 A | 8/1987 | Hourtane et al. |
| 4,698,721 A | 10/1987 | Warren |
| 4,727,350 A | 2/1988 | Ohkubo |
| 4,901,183 A * | 2/1990 | Lee ................... 361/56 |
| 4,952,173 A | 8/1990 | Peronnet et al. |
| 4,984,146 A | 1/1991 | Black et al. |
| 4,985,800 A | 1/1991 | Feldman et al. |
| 5,053,910 A | 10/1991 | Goldstein |
| 5,057,964 A | 10/1991 | Bender et al. |
| 5,102,818 A | 4/1992 | Paschke et al. |
| 5,122,921 A | 6/1992 | Koss |
| 5,124,873 A | 6/1992 | Wheeler |
| 5,142,429 A | 8/1992 | Jaki |
| 5,166,855 A | 11/1992 | Turner |
| 5,278,720 A | 1/1994 | Bird |
| 5,321,573 A | 6/1994 | Persona et al. |
| 5,353,189 A | 10/1994 | Tomlinson |
| 5,442,330 A | 8/1995 | Fuller et al. |
| 5,534,768 A | 7/1996 | Chavannes et al. |
| 5,537,044 A | 7/1996 | Stahl |
| 5,617,284 A | 4/1997 | Paradise |
| 5,625,521 A | 4/1997 | Luu |
| 5,667,298 A | 9/1997 | Musil et al. |
| 5,721,662 A | 2/1998 | Glaser et al. |
| 5,781,844 A * | 7/1998 | Spriester et al. ........... 725/149 |
| 5,790,361 A | 8/1998 | Minich |
| 5,798,790 A | 8/1998 | Knox et al. |
| 5,844,766 A | 12/1998 | Miglioli et al. |
| 5,854,730 A | 12/1998 | Mitchell et al. |
| 5,943,225 A | 8/1999 | Park |
| 5,953,195 A | 9/1999 | Pagliuca |
| 5,963,407 A | 10/1999 | Fragapane et al. |
| 5,966,283 A | 10/1999 | Glaser et al. |
| 5,982,602 A | 11/1999 | Tellas et al. |
| 5,986,869 A | 11/1999 | Akdag |
| 6,026,458 A | 2/2000 | Rasums |
| 6,031,705 A | 2/2000 | Gscheidle |
| 6,054,905 A | 4/2000 | Gresko |
| 6,060,182 A | 5/2000 | Tanaka et al. |
| 6,061,223 A | 5/2000 | Jones et al. |
| 6,086,544 A | 7/2000 | Hibner et al. |
| 6,115,227 A | 9/2000 | Jones et al. |
| 6,137,352 A | 10/2000 | Germann |
| 6,141,194 A | 10/2000 | Maier |
| 6,177,849 B1 | 1/2001 | Barsellotti et al. |
| 6,226,166 B1 | 5/2001 | Gumley et al. |
| 6,236,551 B1 | 5/2001 | Jones et al. |
| 6,243,247 B1 | 6/2001 | Akdag et al. |
| 6,252,755 B1 | 6/2001 | Willer |
| 6,281,690 B1 | 8/2001 | Frey |
| 6,292,344 B1 | 9/2001 | Glaser et al. |
| 6,342,998 B1 | 1/2002 | Bencivenga et al. |
| 6,381,283 B1 | 4/2002 | Bhardwaj et al. |
| 6,385,030 B1 | 5/2002 | Beene |
| 6,394,122 B1 | 5/2002 | Sibley et al. |
| 6,421,220 B2 | 7/2002 | Kobsa |
| 6,502,599 B1 | 1/2003 | Sibley et al. |
| 6,527,004 B1 | 3/2003 | Sibley et al. |
| 6,650,203 B2 | 11/2003 | Gerstenberg et al. |
| 6,721,155 B2 | 4/2004 | Ryman |
| 6,754,060 B2 | 6/2004 | Kauffman |
| 6,757,152 B2 | 6/2004 | Galvagni et al. |
| 6,782,329 B2 | 8/2004 | Scott |
| 6,785,110 B2 | 8/2004 | Bartel et al. |
| 6,789,560 B1 | 9/2004 | Sibley et al. |
| 6,814,100 B1 | 11/2004 | Sibley et al. |
| 6,816,348 B2 | 11/2004 | Chen et al. |
| 6,968,852 B1 | 11/2005 | Sibley |
| 6,975,496 B2 | 12/2005 | Jones et al. |
| 7,082,022 B2 | 7/2006 | Bishop |
| 7,092,230 B2 | 8/2006 | Inauen |
| 7,104,282 B2 | 9/2006 | Hooker et al. |
| 7,106,572 B1 * | 9/2006 | Girard ........................ 361/118 |
| 7,130,103 B2 | 10/2006 | Murata |
| 7,159,236 B2 | 1/2007 | Abe et al. |
| 7,221,550 B2 | 5/2007 | Chang et al. |
| 7,250,829 B2 | 7/2007 | Namura |
| 7,338,547 B2 | 3/2008 | Johnson et al. |
| 7,371,970 B2 | 5/2008 | Flammer et al. |
| 7,430,103 B2 | 9/2008 | Kato |
| 7,453,268 B2 | 11/2008 | Lin |
| 7,623,332 B2 | 11/2009 | Frank et al. |
| 7,675,726 B2 | 3/2010 | Bolz et al. |
| 7,808,752 B2 | 10/2010 | Richiuso et al. |
| 8,408,926 B1 * | 4/2013 | Chang ......................... 439/188 |
| 2002/0167302 A1 | 11/2002 | Gallavan |
| 2002/0191360 A1 | 12/2002 | Colombo et al. |
| 2003/0072121 A1 | 4/2003 | Bartel et al. |
| 2003/0151870 A1 | 8/2003 | Gronbach et al. |
| 2003/0179533 A1 | 9/2003 | Jones et al. |
| 2003/0211782 A1 | 11/2003 | Esparaz et al. |
| 2004/0042149 A1 | 3/2004 | Devine et al. |
| 2004/0121648 A1 | 6/2004 | Voros |
| 2004/0145849 A1 | 7/2004 | Chang et al. |
| 2004/0264087 A1 | 12/2004 | Bishop |
| 2005/0036262 A1 | 2/2005 | Siebenthall et al. |
| 2005/0044858 A1 | 3/2005 | Hooker et al. |
| 2005/0099755 A1 * | 5/2005 | Martin et al. .............. 361/120 |
| 2005/0176275 A1 | 8/2005 | Hoopes et al. |
| 2005/0185354 A1 | 8/2005 | Hoopes |
| 2005/0206482 A1 | 9/2005 | DuToit et al. |
| 2006/0038635 A1 | 2/2006 | Richiuso et al. |
| 2006/0044076 A1 | 3/2006 | Law |
| 2006/0082946 A1 | 4/2006 | Duenez et al. |
| 2006/0120005 A1 | 6/2006 | Van Sickle |
| 2006/0139832 A1 | 6/2006 | Yates et al. |
| 2006/0146458 A1 | 7/2006 | Mueller |
| 2006/0262478 A1 * | 11/2006 | Chaudhry ................... 361/119 |
| 2007/0053130 A1 | 3/2007 | Harwath |
| 2007/0095400 A1 | 5/2007 | Bergquist et al. |
| 2007/0097583 A1 | 5/2007 | Harwath |
| 2007/0139850 A1 | 6/2007 | Kamel et al. |
| 2008/0170346 A1 | 7/2008 | Van Swearingen |
| 2009/0103226 A1 | 4/2009 | Penwell et al. |
| 2009/0109584 A1 | 4/2009 | Jones et al. |
| 2009/0284888 A1 | 11/2009 | Bartel et al. |
| 2009/0296430 A1 | 12/2009 | Rieux-Lopez et al. |
| 2011/0080683 A1 | 4/2011 | Jones et al. |
| 2011/0141646 A1 | 6/2011 | Jones et al. |
| 2011/0159727 A1 | 6/2011 | Howard et al. |
| 2011/0279943 A1 | 11/2011 | Penwell et al. |

FOREIGN PATENT DOCUMENTS

| | | |
|---|---|---|
| JP | 11-037400 | 2/1999 |
| JP | 2003-070156 | 3/2003 |
| JP | 2003-111270 | 4/2003 |
| KR | 10-2003-0081041 | 10/2003 |
| KR | 1020090018497 | 2/2009 |
| WO | WO 95/10116 | 4/1995 |
| WO | WO 2011-119723 | 12/2011 |

* cited by examiner

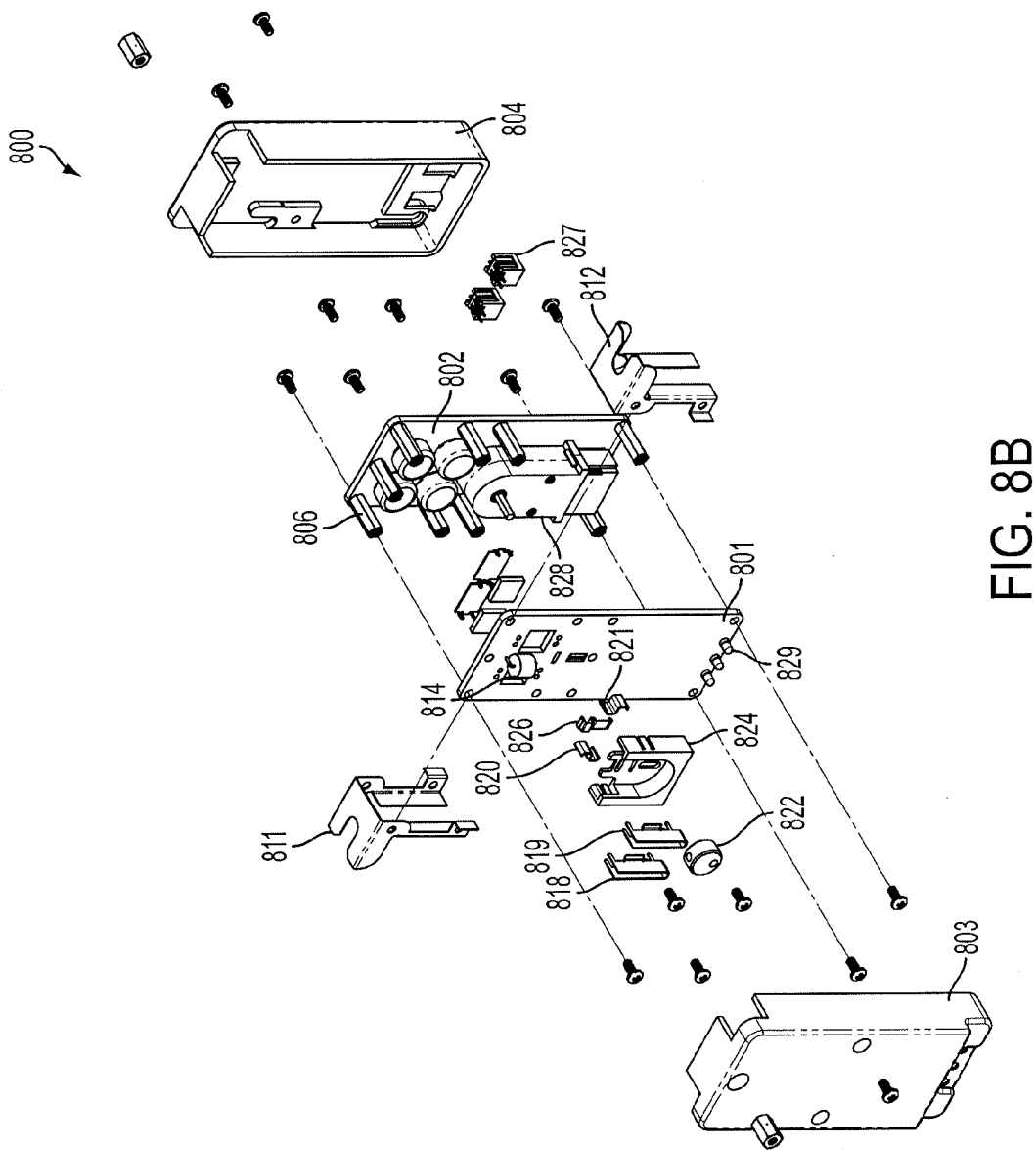
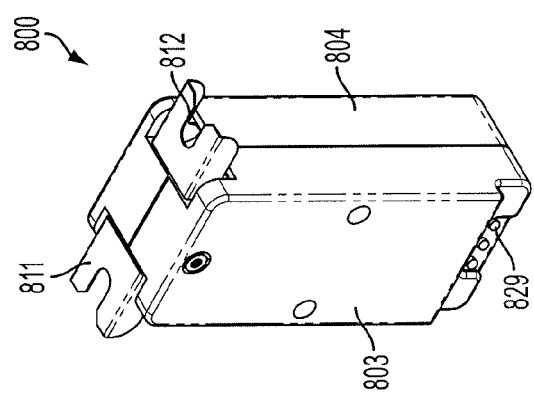
FIG. 8B
FIG. 8A

RAIL SURGE VOLTAGE PROTECTOR WITH FAIL DISCONNECT

CROSS-REFERENCE TO RELATED APPLICATION

This application claims the benefit and priority of U.S. Provisional Application No. 61/704,198, filed on Sep. 21, 2012, entitled "Rail Surge Voltage Protector with Fail Disconnect," which is hereby incorporated by reference in its entirety.

BACKGROUND

1. Field

The present disclosure generally relates to an over voltage surge protection circuit. More particularly, the present disclosure relates to a rail surge voltage protector applied to railway tracks in the rail industry, providing lower residual voltage than gas discharge tubes commonly used in the rail industry.

2. Description of the Related Art

The railway industry uses electrical signals to help monitor and manage railway traffic. For example, a track circuit may be attached to the rails of a train track to electrically determine the presence of a train on the train track, such as its speed and location. The track circuit allows railway signaling systems to semi-automatically display traffic signals, which includes signals to slow down or stop for an occupied track such as rail crossing arms or to signal other unsafe conditions, and signals to switch tracks.

Because the tracks may be electrified, surge or over voltage protection is required to protect attached track circuits. A rail surge voltage protector provides means of surge protection. The rail surge voltage protector must also provide failsafe self-detection and disconnection in case of a catastrophic short circuit surge component failure in order to prevent erroneous track switching function. The rail surge voltage protector cannot interfere with or be affected by other rail circuit operations, such as audio frequency range signal generation, parallel relay activation functions, immunity to high voltage wave shapes which appear across rails, extraneous noise levels from power line coupling and potential short circuit or partial short conditions occurring across the rails, yet must still be able to detect its own surge components in case of shorts. A modular rail surge voltage protector would more easily be installed with standard rail buss connections. The rail surge voltage protector would also have a terminal connection or path to earth ground.

In addition, the rail surge voltage protector must not add alien signals or otherwise interfere with normal rail signals or operating voltages mandating high impedance/resistance passive circuits for detection. For example, one typical application may provide a 12Vdc nominal at 15 mA. Typically, a 4Vpk-pk 100 Hz to 20 kHz square wave at 500 mA is applied across the rails in the proximity of a train.

The disconnect relay mechanism must mechanically disconnect the entire circuit from the rails once the disconnect scheme is triggered by a follow-on track signal. The disconnect relay mechanism must have the mechanical advantage to overcome or disengage any contact spot welding that may occur during a catastrophic surge event. The surge components and disconnect relay contacts must be robust enough to handle 15kA 8 us/20 us surge currents, operating at −25 degrees C. to +85 degrees C.

SUMMARY

The present disclosure describes a surge protector circuit. The surge protector circuit detects voltage imbalance in the signal caused by shorted components between each rail referenced to a virtual ground/return node. AC coupling helps tailor response sensitivity and adds noise and surge pulse immunity to the entire circuit. A relay action, triggered by a voltage level latch, is achieved through a high ratio gear-motor combined with a low friction eccentric to convert to high torque linear contact disengagement.

In one implementation, a surge protector comprises a first terminal configured to transmit a signal, the signal operating within a normal range, and a second terminal configured to transmit the signal. The surge protector also comprises a surge protection stage connected to the first and second terminals, a short detection stage connected to the surge protection stage and configured to detect an imbalance in the signal when the signal is outside the normal range, an electromechanical device configured to disconnect the first and second terminals from the surge protection stage, and a trigger stage connected to the short detection stage and the electromechanical device and configured to actuate the electromechanical device when the short detection stage detects the imbalance in the signal.

In another implementation, a surge protector comprises a first terminal configured to transmit a signal, the signal operating within a normal range, and a second terminal configured to transmit the signal. The surge protector further comprises a surge protection stage connected to the first and second terminals and including a transient-voltage-suppression (TVS) diode and a gas discharge tube (GDT), a short detection stage connected to the surge protection stage, including a balanced bridge, and configured to detect an imbalance in the signal when the signal is outside the normal range, an electromechanical device configured to disconnect the first and second terminals from the surge protection stage, a trigger stage connected to the short detection stage and the electromechanical device, including a latch and an opto-coupler, and configured to actuate the electromechanical device when the short detection stage detects the imbalance in the signal, a visual operating indicator configured to indicate no imbalance detected in the signal, and an alarm stage connected to the trigger stage and configured to activate an alarm when the trigger stage is activated.

BRIEF DESCRIPTION OF THE DRAWINGS

Other systems, methods, features, and advantages of the present disclosure will be or will become apparent to one with skill in the art upon examination of the following figure and detailed description. It is intended that all such additional systems, methods, features, and advantages be included within this description, be within the scope of the present disclosure, and be protected by the accompanying claims. Component parts shown in the drawing are not necessarily to scale, and may be exaggerated to better illustrate the important features of the present disclosure. In the drawing, like reference numerals designate like parts throughout different views, wherein:

FIG. 8A is another mechanical package of a surge voltage protector according to an implementation of the present disclosure.

FIG. 8B is an exploded view of the surge voltage protector of FIG. 8A according to an implementation of the present disclosure.

DETAILED DESCRIPTION

Figure 1:
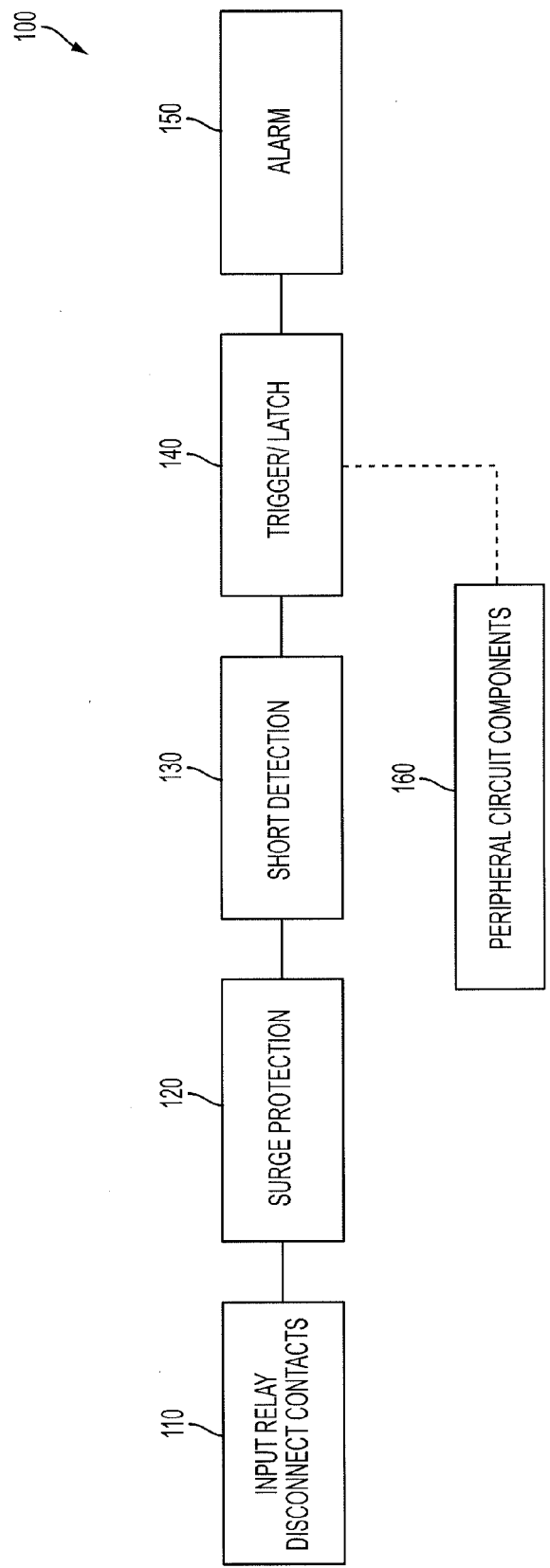
FIG. 1 is a block diagram of a rail surge voltage protector according to an implementation of the present disclosure.

Although the present disclosure is generally discussed in the context of a rail application, the circuits and corresponding devices described may be used with any two line signal paths or control circuits where an earth ground is not one of the lines. FIG. 1 depicts a block diagram of a rail surge voltage protector (RSVP) 100 according to an implementation of the present disclosure. The RSVP 100 includes an input relay disconnect contacts stage 110, a surge protection stage 120, a short detection stage 130, a trigger/latch stage 140, an alarm stage 150, and peripheral circuit components 160.

The input relay disconnect contacts stage 110 includes two line terminals which connect to each rail via a standard rail buss format. The input relay disconnect contacts stage 110 also includes an earth ground wire provision. The input relay disconnect contacts stage 110 serves as the disconnect point of the relay contacts.

The surge protection stage 120 provides surge protection in the rail signal. The surge protection stage 120 include a low voltage transient-voltage-suppression (TVS) connected from each rail to a virtual reference voltage. The virtual reference voltage is connected via a gas discharge tube (GDT) to an earth ground. When a surge event occurs on the rail signal, the surge protection stage 120 provides a surge current path to the earth ground. A GDT provides good isolation from track noise due to extremely low capacitance. However, in other implementations, the virtual ground to earth ground connection may be a diode or metal oxide varistor (MOV).

The short detection stage 130 detects imbalances in the rail signal. The short detection stage 130 includes a balanced bridge circuit whose output increases proportionately to an imbalanced ration due to a perceived short in the track circuit. When a surge event occurs, surge components in the track circuit, which may include the surge protection stage 120, may fail. At the next rail signal, the shorted components corrupt the rail signal, causing an imbalance in the signal. The short detection stage 130 compares the rail signal to another signal, such as a reference or standard signal, or by determining whether the rail signal is outside a normal operating range. By detecting an imbalance in the rail signal, the short detection stage 130 can detect shorts as well as other corruptions in the rail signal.

When the short detection stage 130 detects an imbalance in the rail signal, the trigger/latch stage 140 is activated. The trigger/latch stage 140 is configured to latch upon reaching a specified threshold from the short detection stage 130. The trigger/latch stage 140 may further trigger the relay contacts of the input relay disconnect contacts stage 110 to physically disconnect from the rest of the RSVP 100, in particular from the surge protection stage 120.

The trigger/latch stage 140 may further trigger the alarm stage 150. The alarm stage 150 may include visual and/or audible indicators indicating that the trigger/latch stage 140 was activated. For example, the indicators may include a green LED as a visual operating indicator, and a red LED as an alarm indicator.

The peripheral circuit components 160 generally include additional components in the RSVP 100. For example, the peripheral circuit components 160 may include a power supply to charge capacitors, and power the indicators of the alarm stage 150, which may include various color LEDs and/or sirens. In certain implementations the power connections are separate from the other stages and only serve to charge the capacitors and power the various indicators, such as a green LED as a visual operating indicator and red LEDs as alarm indicators. The peripheral circuit components 160 may further include regulators, filtering and storage capacitors, and mechanical components, such as a gear motor, a cam action guide, and relay contact parts. The peripheral circuit components 160 may be connected to the trigger/latch stage 140, but may also be connected to other stages. The RSVP 100 will be discussed in more detail below.

Figure 2A:
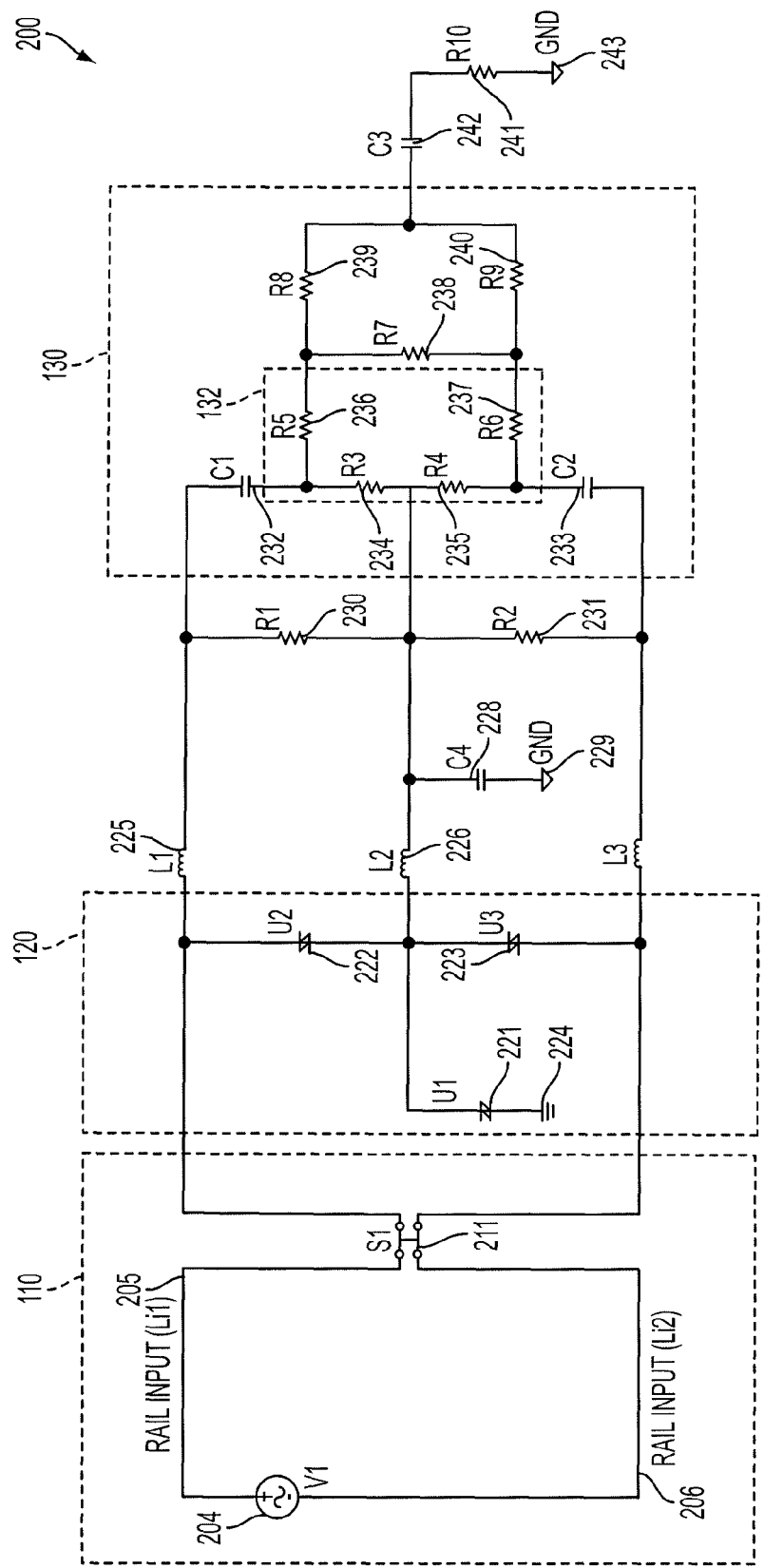
FIG. 2A is a circuit diagram of an input/detection stage according to an implementation of the present disclosure.

Turning to FIG. 2A, FIG. 2A depicts a diagram of an input/detection stage 200. The input/detection stage 200 includes the input relay disconnect contacts stage 110, the surge protection stage 120, and the short detection stage 130.

The input relay disconnect contacts stage 110 includes a voltage (V1) 204, a first rail input (Li1) 205, a second rail input (Li2) 206, and a switch (S1) 211. The voltage 204 represents a rail signal, which is connected to the first rail input 205 and the second rail input 206. The switch 211 is a relay that when activated, disconnects the RSVP 100 from the rail tracks when a surge component failure is detected. As seen in FIG. 2A the switch 211 provides paths for both the first rail input 205 and the second rail input 206. In other implementations, the switch 211 may be any other collocated or remote disconnect mechanism.

The surge protection stage 120 includes a GDT (U1) 221, a low voltage TVS (U2) 222, a low voltage TVS (U3) 223, and an earth ground 224. The GDT 221 provides a surge current path for the TVS 222 and the TVS 223 to the earth ground 224. The TVS 222 and the TVS 223 provides rail to rail protection, as well as rail to earth ground protection in conjunction with the GDT 221. The TVS 222 may be connected to the first rail input 205 and the TVS 223 may be connected to the second rail input 206.

The input/detection stage 200 also includes an inductor (L1) 225, an inductor (L2) 226, and an inductor (L3) 227, a capacitor (C4) 228, a ground (GND) 229, a resistor (R1) 230, and a resistor (R2) 231. These components may be grouped with the peripheral circuit components 160. The inductor 225, the inductor 226, and the inductor 227 provide attenuation to fast rise time pulses, and further forms part of a bandpass filter for the circuit operating range, in conjunction with the capacitor 228, the resistor 230, and the resistor 231.

The capacitor 228 provides an AC coupled return path to the ground 229 for a detector output at a capacitor (C3) 242. The capacitor 228 also establishes a reference zero for trigger threshold levels for the trigger/latch stage 140. The resistor 230 and the resistor 231 establish initial circuit balance and DC load values.

The short detection stage 130 includes a capacitor (C1) 232, a capacitor (C2) 233, a resistor (R3) 234, a resistor (R4) 235, a resistor (R5) 236, a resistor (R6) 237, a resistor (R7) 238, a resistor (R8) 239, and a resistor (R9) 240. The resistor 234, the resistor 235, the resistor 236, and the resistor 237 are equal value components which form a balanced bridge 132 for initial operating conditions. The capacitor 232 and the capacitor 233 provide AC coupling to the balanced bridge 132 and is part of the bandpass filter. The resistor 238 provides a load for the balanced bridge 132. The resistor 239 and the resistor 240 provide mixing resistors to output to the capacitor 242.

The input/detection stage 200 further includes the capacitor 242, a resistor (R10) 241, and a ground (GND) 243. The capacitor 242 serves as an AC coupled output of the input/detection stage 200. The ground 243 may be the same ground connection as the ground 229, which may be electrically isolated from the earth ground 224. The resistor 241 represents a virtual output load. In actual use, the voltage 204 and the resistor 241 may be replaced with connections to other active circuits or stages.

Under normal conditions, where no components are shorted, with a fully balanced circuit impedance, any common rail signal input to the first rail input 205 and the second rail input 206 is cancelled out and results in theoretical zero output at the capacitor 242. Any difference of the resistive value between the TVS diode 222 and the TVS diode 223, which occurs when components are shorted or partially shorted, results in an output voltage level that increases proportionately to the rate of imbalanced values. Thus, a non-zero value may indicate shorted components.

Figure 2B:
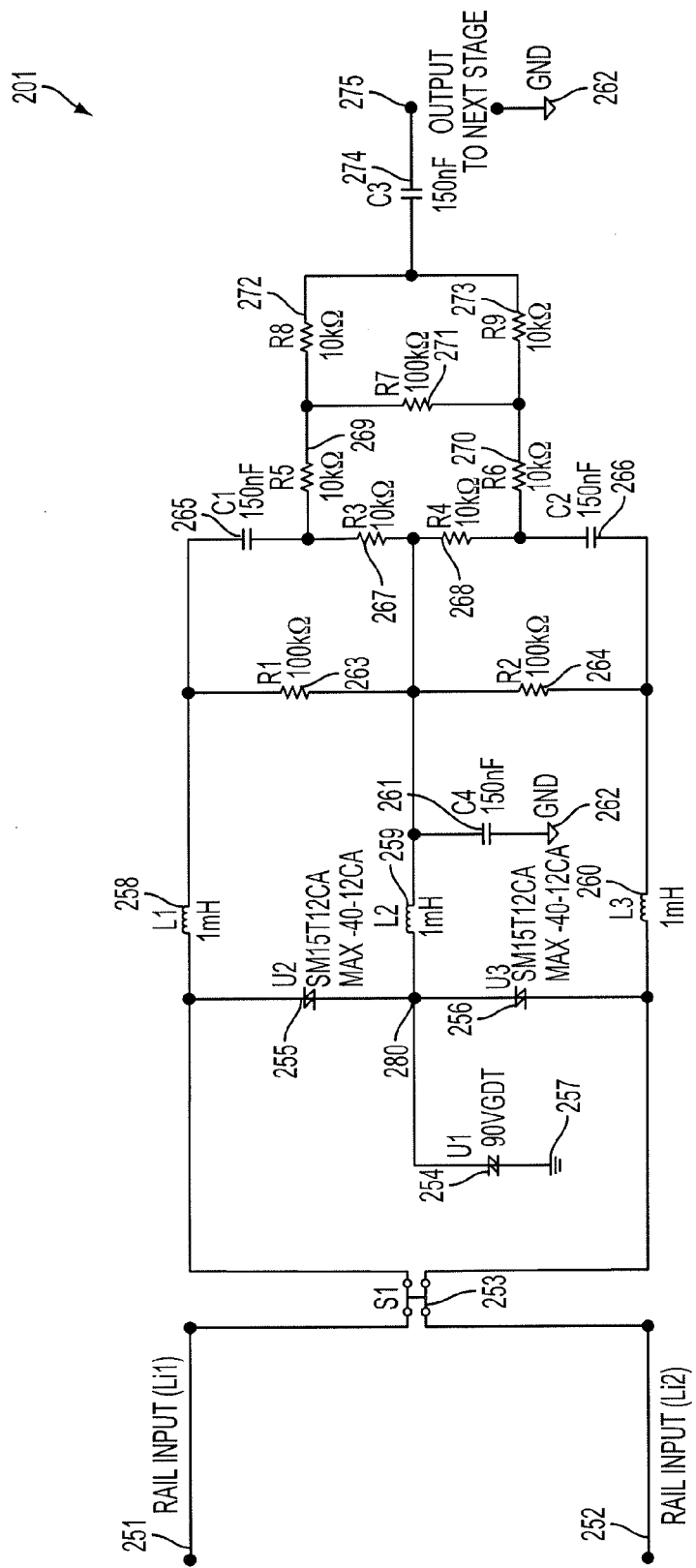
FIG. 2B is a circuit diagram of an input/detection stage according to another implementation of the present disclosure.

FIG. 2B illustrates an exemplary implementation of an input/detection stage 201. The input/detection stage 201 is configured to address signals applied between rails which vary in frequency from 80 Hz to 20 kHz, a square wave of 50% duty cycle with a 2V peak voltage or a 4V peak-to-peak voltage. In other implementations, the RSVP 100 may be adjusted for other frequencies and signal levels. Similarly labeled components, such as L1 or S1, correspond to the components of FIG. 2A.

The input/detection stage 201 includes a first rail input (Li1) 251 and a second rail input (Li2) 252, connected to a switch (S1) 253. A GDT (U1) 254 may be a 90V GDT. Higher value GDTs, such as 300V, may be selected if significant AC noise has developed across the rails and noise isolation is desired. A TVS diode (U2) 255 and a TVS diode (U3) 256 may both be the same TVS diode having a peak pulse power of 40 kW, a breakdown voltage of 12V, and is bidirectional. A node 280 is a common junction for the TVS diode 255, the TVS diode 256, and the GDT 245. An inductor (L1), an inductor (L2) 259, and an inductor (L3) 260 may be 1 mH inductors. A capacitor (C4) 261 may be 150 nF. A ground (GND) 262 provides a ground connection. A resistor (R1) 263 and a resistor (R2) 264 may be 100 kΩ resistors. A capacitor (C1) 265, a capacitor (C2) 266, and a capacitor (C3) 274 may be 150 nF capacitors. A resistor (R3) 267, a resistor (R4) 268, a resistor (R5) 269, a resistor (R6) 270, a resistor (R8) 272, and a resistor (R9) 273 may be 10 kΩ resistors. A resistor (R7) 271 may be a 100 kΩ resistor. An output 275 connects to the next stage, which may be the trigger/latch stage 140.

Figure 2C:
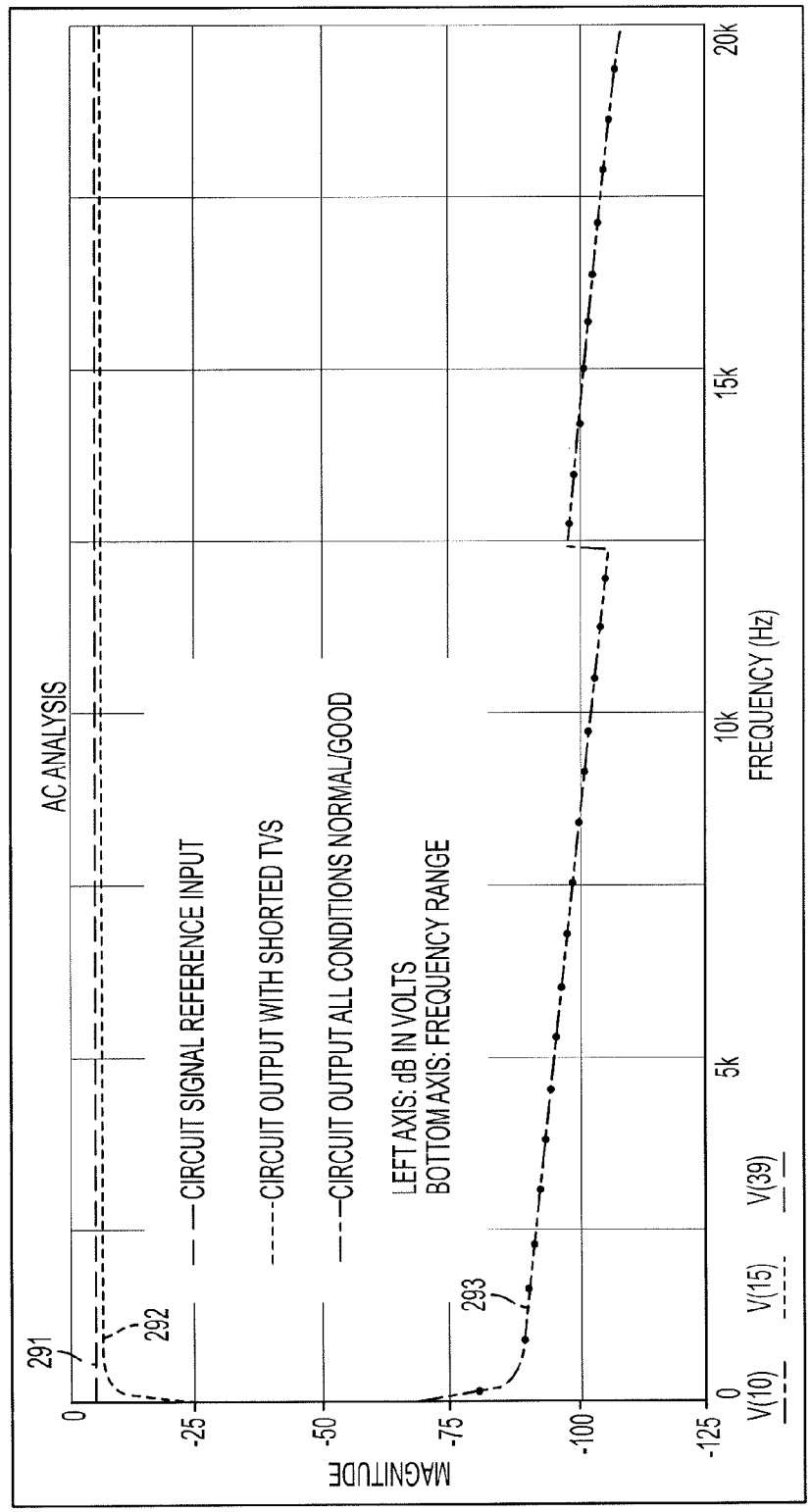
FIG. 2C is a graph of a simulation of an input/detection stage according to an implementation of the present disclosure.

FIG. 2C depicts a graph 290 of a simulation of the input/detection stage 201 comparing a normal and shorted signal, 100 Hz to 20 kHz response. A normal curve 291 represents a normal signal, or reference input. A shorted curve 292 represents a circuit output with a shorted TVS. An output curve 293 represents a circuit output when all conditions are normal or good. When a greater than 70 dB worst case open delta increases to greater than 100 dB at higher frequencies, this reflects immunity to normal rail signal false triggering.

Figure 3A:
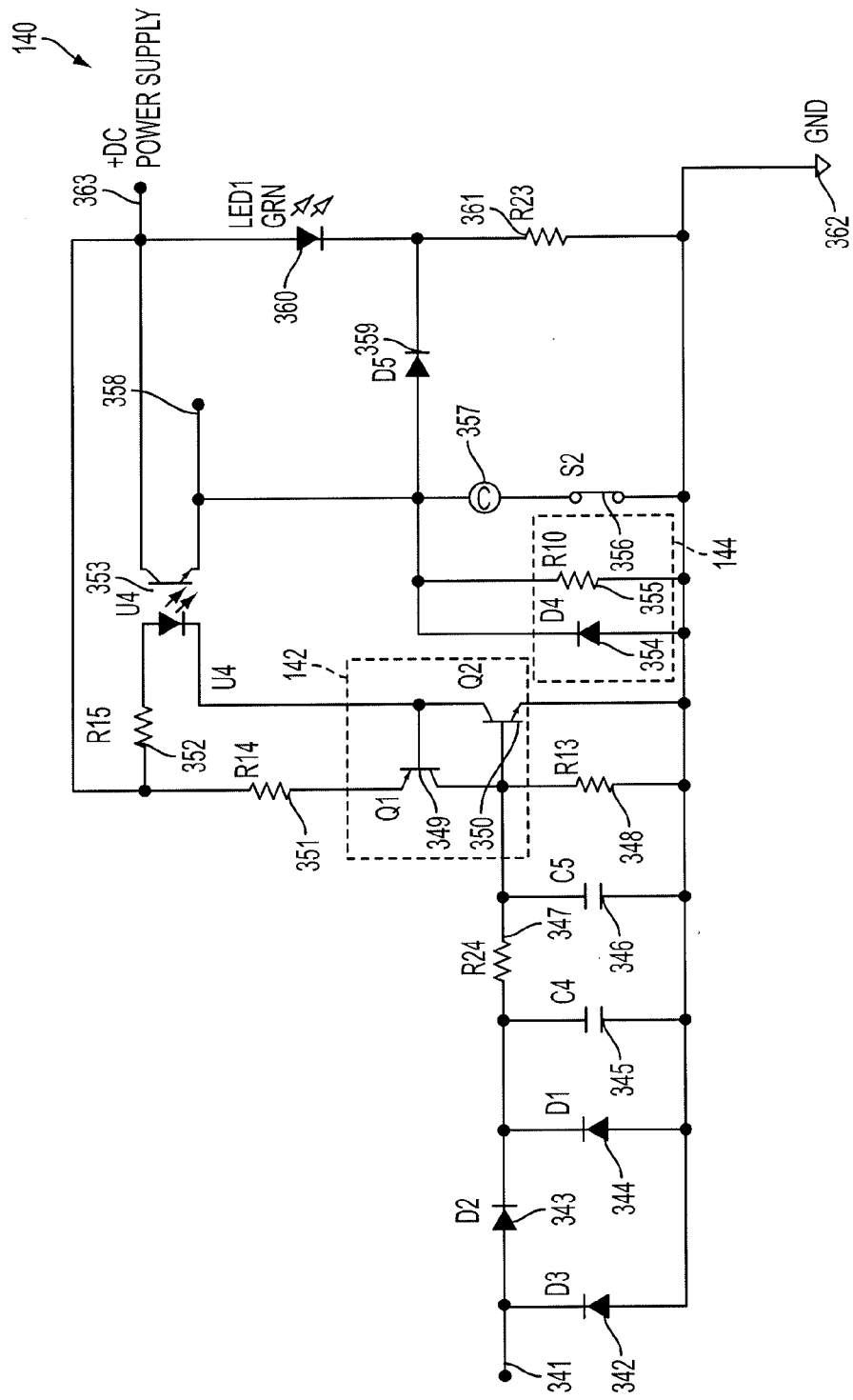
FIG. 3A is a circuit diagram of a short detection stage according to an implementation of the present disclosure.

Turning to FIG. 3A, FIG. 3A depicts the trigger/latch stage 140. An input 341 may be an AC output of an input detection stage, such as the input relay disconnect contacts stage 110 or the output 275 in FIG. 2B. A diode (D3) 342, a diode (D2) 343, and a diode (D1) 344 rectifies the AC input from the input 341 to a DC voltage level. A capacitor (C4) 345 and a capacitor (C5) 346 provide DC filtering and a response delay for a latch trigger threshold. A resistor (R24) 347 and a resistor (R13) 348 set a voltage divider to adjust a sensitivity for a latch circuit 142. A transistor (Q1) 349 and a transistor (Q2) 350 form the latch circuit 142, which may be triggered by a voltage at the base of the transistor 350, and provides a sink for an input to an opto-coupler (U4) 353.

A resistor (R14) 351 provides current limiting for the transistor 349. A resistor (R15) 352 provides current limiting for the input to the opto-coupler 353. The opto-coupler 353 is a main switch providing power from an output of the opto-coupler 353 when it is triggered to activate a disconnect relay motor (K1) 357. A power output 358 turns on an alarm stage, such as the alarm stage 150, when the opto-coupler 353 is triggered.

A diode (D4) 354 and a resistor (R10) 355 form a snubber circuit 144 and damper across the disconnect relay motor 357 to prevent inductive spikes that might develop during switching. The disconnect relay motor 357 moves contact for disconnecting the RSVP 100 from the rail terminals, which will be discussed further below. A switch (S2) 356 is a position switch which disconnects the disconnect relay motor 357 after it has cycled.

A diode (D5) 359 is a steering diode which shuts off an LED (GRN) 360 when the opto-coupler 353 is triggered. The LED 360 is a power ON indicator that the circuit is "okay," or normal, and powered on. A resistor (R23) 361 provide current limiting for the LED 360. A ground (GND) 362 is a circuit ground, which may be isolated from an earth ground, such as the earth ground 224 or the earth ground 257. A power supply line 363 connects to a DC power supply.

Figure 3B:
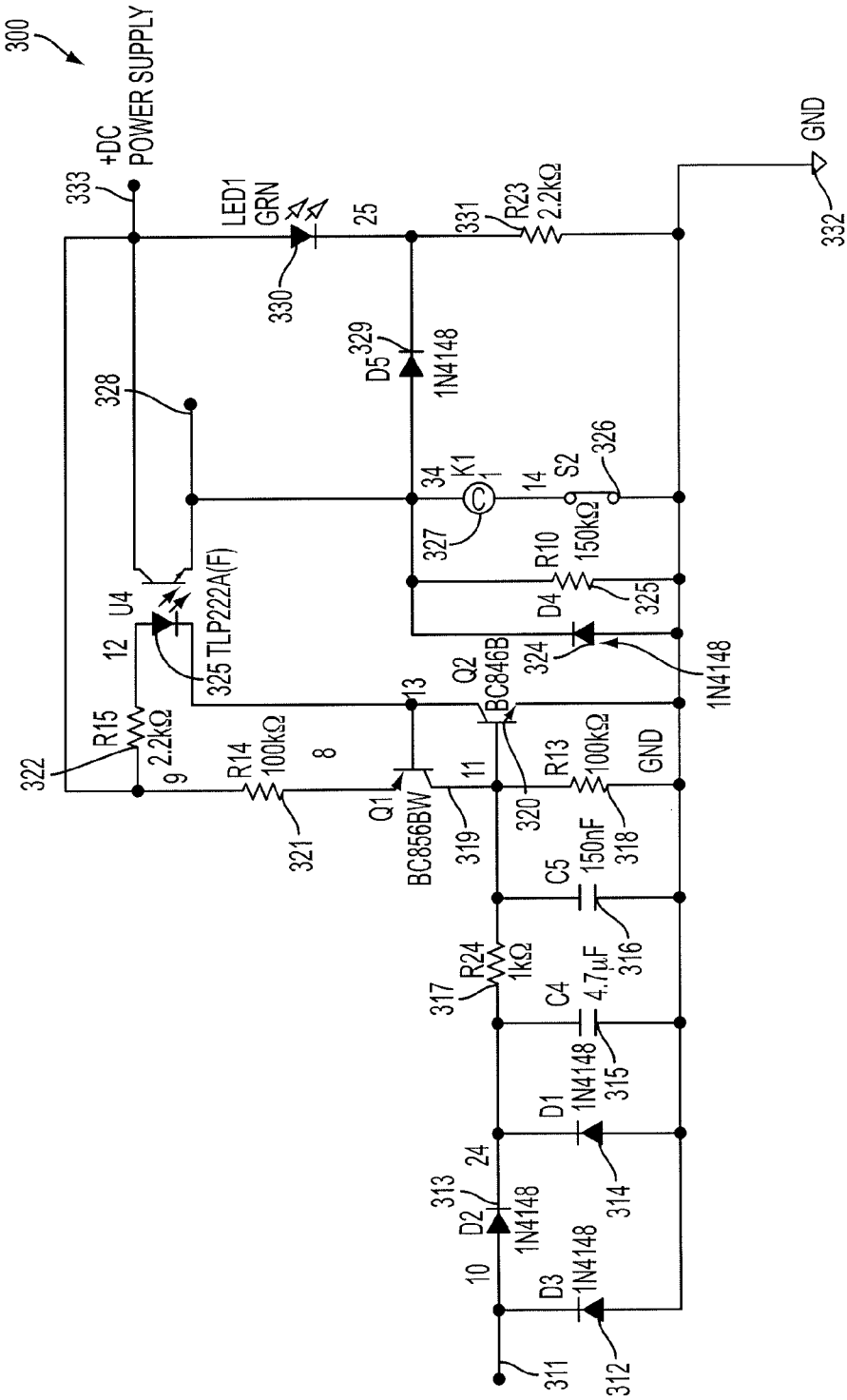
FIG. 3B is a circuit diagram of a trigger/latch stage according to another implementation of the present disclosure.

FIG. 3B depicts an exemplary implementation of a trigger/latch stage 300. Similarly labeled components, such as D3 or Q1, correspond to the components of FIG. 3A. In other implementations, the components depicted in FIG. 3B may be different to suit a particular application. An input 311 may be connected to the output 275. A diode (D3) 312, a diode (D2) 313, and a diode (D1) 314 may be 1N4148 diodes, which is a silicon switching diode useful for switching applications up to about 100 MHz with a reverse-recovery time of no more than 4 ns. A capacitor (C4) 315 may be 4.7 µF, and a capacitor (C5) 316 may be 150 nF. A resistor (R24) 317 may be 1 kΩ. A resistor (R13) 318 and a resistor (R14) 321 may be 100 kΩ. A transistor (Q1) 319 may be a (BC856BW) PNP transistor having a maximum current of 100 mA and a maximum voltage of 65 V. A transistor (Q2) 320 may be a (BC846B) NPN transistor, also rated at 100 mA and 65 V. A resistor (R15) 322 may be 2.2 kΩ. An opto-coupler (U4) 325 may be a TLP222A (F) photocoupler having an on-state resistance of 2Ω max, load current of 500 mA, voltage input of 1.15 VDC, and a voltage load of 0-60 V. A diode (D4) 324 and a diode (D5) 329 may also be 1N4148 diodes. A resistor (R10) 325 is 150 kΩ. A disconnect relay motor (K1) 327 may be a gear-motor of 120:1 reduction ratio or other electromechanical device capable of disconnecting contacts, as will be discussed further below. A power output 328 turns on an alarm stage when the opto-coupler 325 is triggered. A power supply line 333 connects to a DC power supply. An LED (GRN) 330 may be a green LED. A resistor (R23) 331 may be 2.2 kΩ. A ground (GND) 332 may be a circuit ground, isolated from an earth ground.

Figure 4:
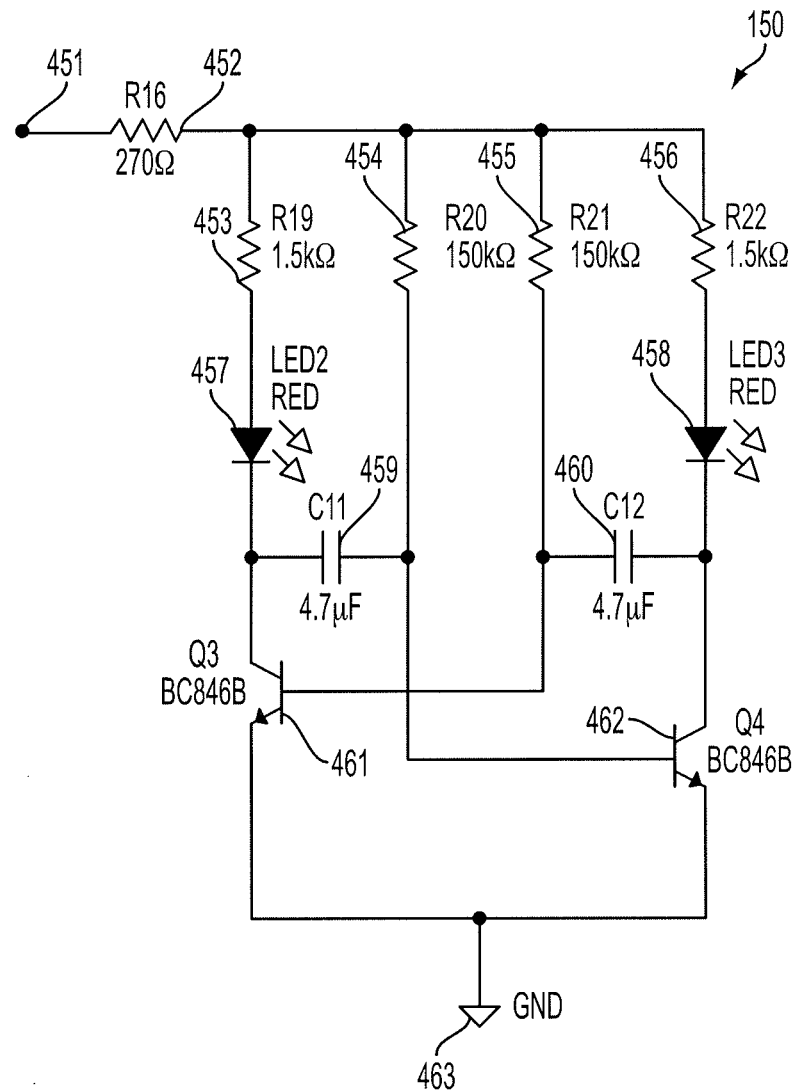
FIG. 4 is a circuit diagram of an alarm stage according to an implementation of the present disclosure.

FIG. 4 depicts a diagram of an exemplary implementation of the alarm stage 150. In other implementations, the components may be different to suit a particular application. An input 451 is connected to an output of a previous stage, such as the output 358 of FIG. 3A or the output 328 of FIG. 3B, which are outputs from the opto-coupler 353 and the opto-coupler 325, respectively. A resistor (R16) 452 may be 270Ω, a resistor (R19) 453 may be 1.5 kΩ, a resistor (R20) 454 may be 150 kΩ, a resistor (R21) 455 may be 150 kΩ, and a resistor (R22) 456 may be 1.5 kΩ. An LED (RED) 457 and an LED (RED) 458 may be red LEDs, serving as a visual alarm indicator when an imbalance or short is detected. A capacitor (C11) 459 and a capacitor (C12) 460 may be 4.7 μF. A transistor (Q3) 461 and a transistor (Q4) 462 may each be BC846B NPN transistors. A ground (GND) 463 provides a ground connection, which may be isolated from an earth ground.

The alarm stage 150 may be an astable multivibrator circuit with a 50% duty cycle. The resistor 454 and the resistor 455, in conjunction with the capacitor 459 and the capacitor 460, set a time constant to adjust a flash rate for the LED 457 and the LED 458. In other implementations, the alarm stage 150 may include other components, such as sirens and audible indicators or other indicators, and modified as needed for a particular application.

Figure 5:
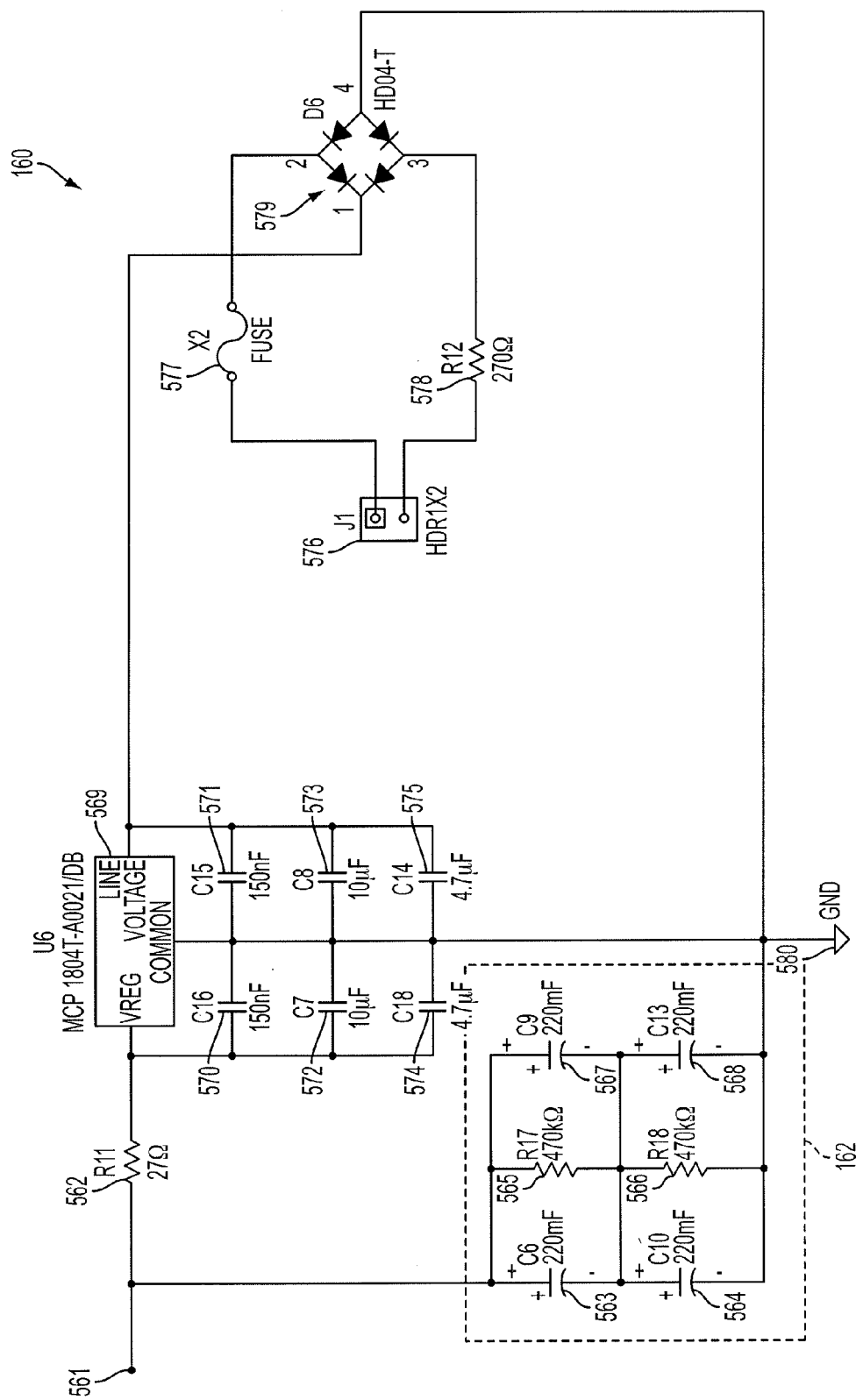
FIG. 5 is a circuit diagram of peripheral circuit components according to an implementation of the present disclosure.

FIG. 5 depicts a diagram of an exemplary implementation of the peripheral circuit components 160. In FIG. 5, the peripheral circuit components 160 may be a power supply stage and a capacitor storage bank. In other implementations, the peripheral circuit components 160 may include other stages and components as needed for a particular application.

A node 561 provides a DC regulated output to the rest of the circuit, and may be connected to, for example, the power supply line 363 of the trigger/latch stage 140 or the power supply line 333 of the trigger/latch stage 300. A resistor (R11) 562 adds some current limiting, may be 27Ω. A capacitor (C6) 563, a capacitor (C10) 564, a capacitor (C9) 567, and a capacitor (C13) 568 form a high capacity storage bank or capacitor bank 162. The capacitor bank 162 provides a high current to a relay motor, such as the disconnect relay motor 327 of the trigger/latch stage 140, when the RSVP 100 is switched on. The capacitor 563, the capacitor 564, the capacitor 567, and the capacitor 568 may be 220 mF. The capacitor bank 162 may further include a resistor (R17) 565 and a resistor (R18) 566, which are bleeder/balance resistors providing equal voltage distribution for the serial capacitors. The resistor 565 and the resistor 566 may be 470 kΩ.

A voltage regulator (U6) 569 provides a DC output. The voltage regulator 569 may be an MCP 1804T-A0021/DB low dropout voltage regulator providing a 10 Vdc output delivering up to 150 mA of current. A capacitor (C16) 570, a capacitor (C15) 571, a capacitor (C7) 572, a capacitor (C8) 573, a capacitor (C18) 574, and a capacitor (C14) 575 are power supply filter capacitors for the voltage regulator 569. The capacitor 570 and the capacitor 571 may be 150 nF. The capacitor 572 and the capacitor 573 may be 10 μF. The capacitor 574 and the capacitor 575 may be 4.7 μF.

A connector (J1) 576 provides a DC input. The connector 576 may be an HDR1X2 header, for a DC input in a range of about 11 V to 14 V. A fuse (X2) 577 may be rated at 100 mA. A resistor (R12) 578 is an inrush current limiting resistor. The resistor 578 may be 270Ω. A full wave diode bridge (D6) 579 adds a voltage drop and DC steering, providing reverse power hook-up protection. The full wave diode bridge 579 includes four diodes, which may be HD04-T diodes, bridge rectifiers with a peak reverse voltage of 400 V, and a forward continuous current of 0.8 A.

Figure 6:
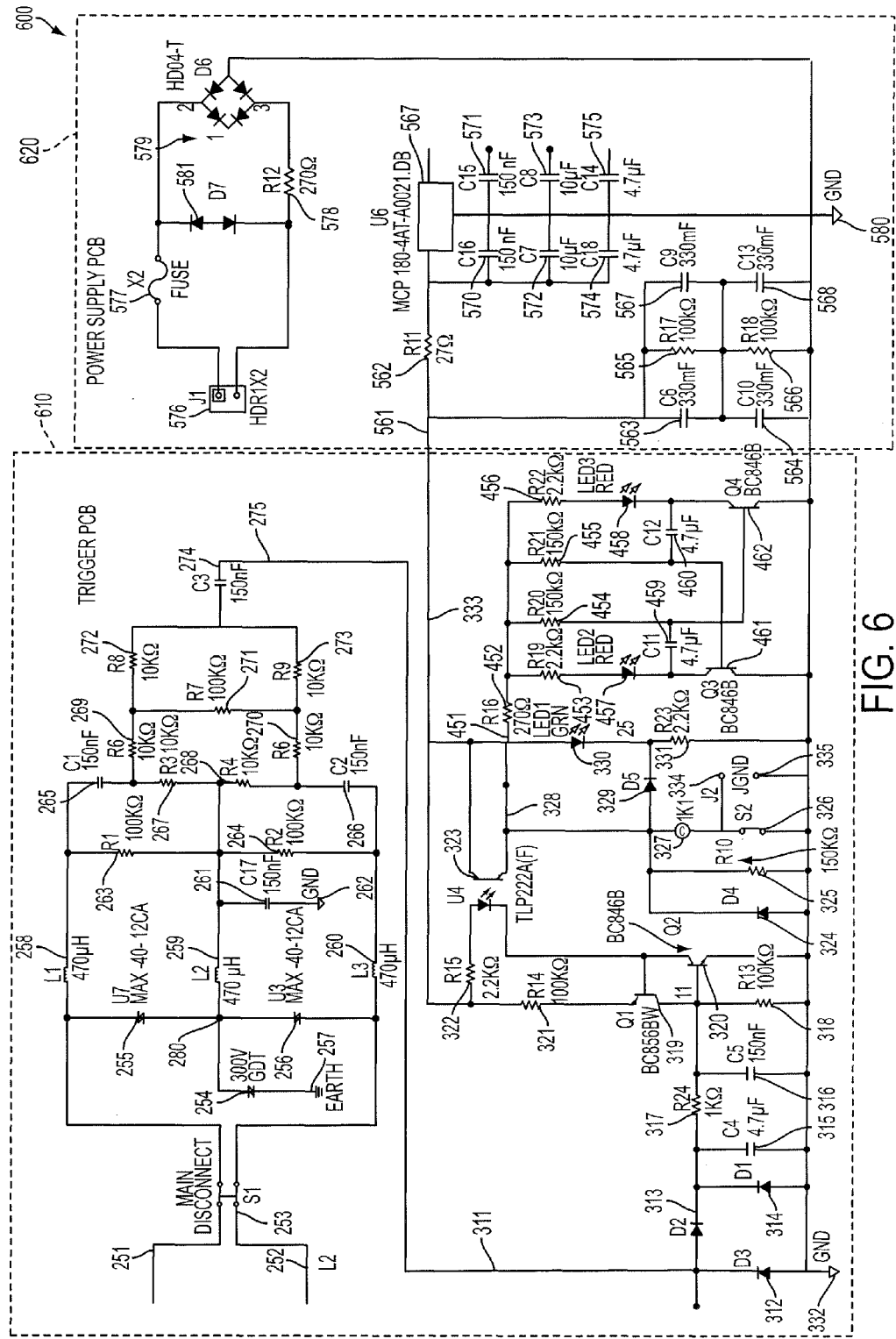
FIG. 6 is a circuit diagram of a surge voltage protector according to an implementation of the present disclosure.

FIG. 6 depicts a diagram of another implementation of an RSVP 600. The RSVP 600 is generally a combination of the input relay disconnect contacts stage 201, the trigger/latch stage 300, the alarm stage 150, and the peripheral circuit components 160. Similarly numbered components correspond to components in FIGS. 2B, 3B, 4 and 5, though certain differences in the characteristics or specifications of components may differ as labeled in FIG. 6. The output 275 connects with the input 311 to connect the input/detection stage 201 with the trigger/latch stage 300. The output 328 of the trigger/latch stage 300 connects to the input 451 of the alarm stage 150. The power supply line 333 connects to the node 561 of the peripheral circuit components 160.

FIG. 6 further shows that the input/detection stage 201, the trigger/latch stage 300, and the alarm stage 150 may be grouped as a trigger printed circuit board (PCB) 610. The peripheral circuit components 160 may be grouped as a power supply PCB 620.

Figure 7A:
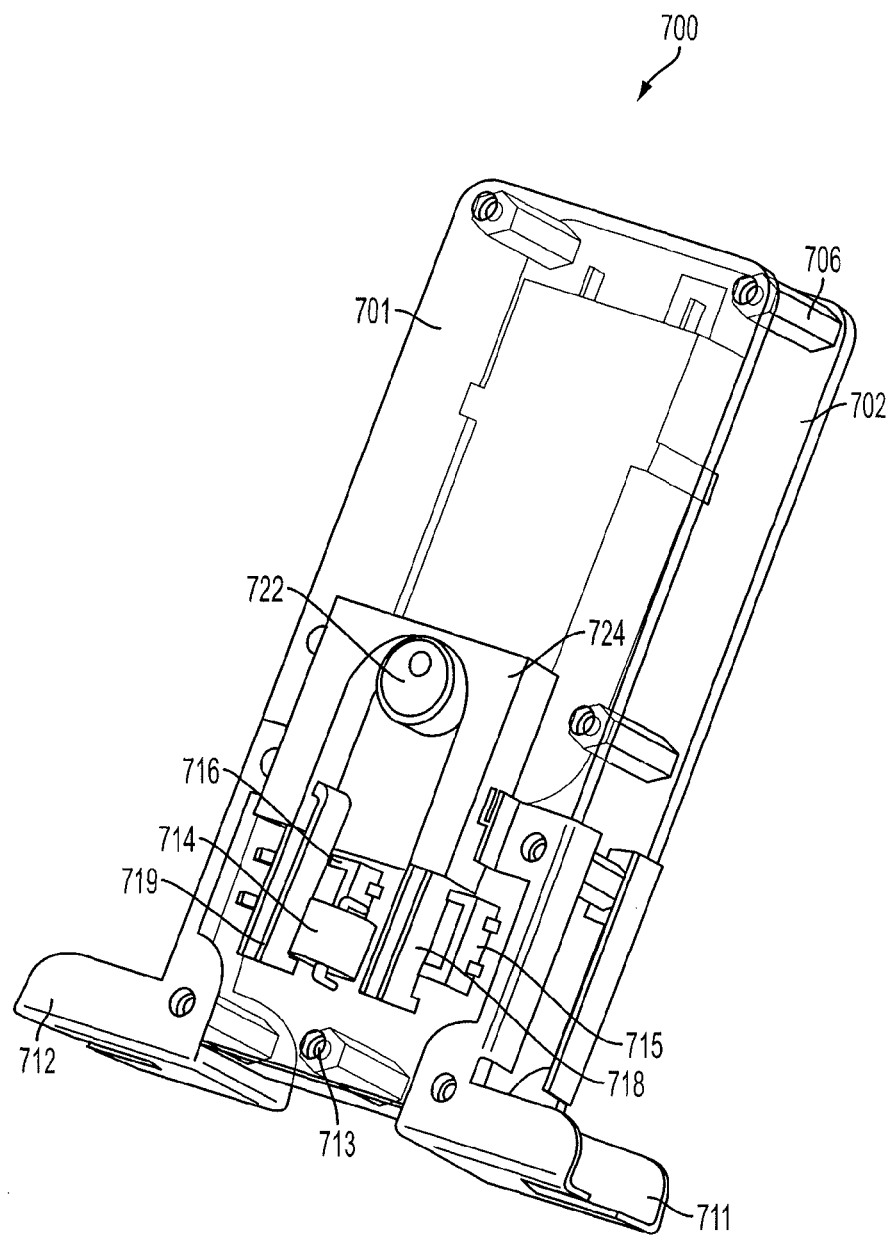
FIG. 7A is a mechanical package of a surge voltage protector according to an implementation of the present disclosure.

FIGS. 7A-7F depict an exemplary implementation of an RSVP 700 in a mechanical package. As seen in FIG. 7A, the RSVP 700 includes two PCBs, a trigger PCB 701 which corresponds to the trigger PCB 610, and a power supply PCB 702 which corresponds to the power supply PCB 620. The trigger PCB 701 and the power supply PCB 702 are stacked atop each other and separated by standoffs such as a standoff 706. A first rail terminal 711, which may correspond to the first rail input 205 and the first rail input 251, and a second rail terminal 712, which may correspond to the second rail input 206 and the second rail input 252, sandwich the trigger PCB 701 and the power supply PCB 702. The first rail terminal 711 and the second rail terminal 712 are configured to connect to a track buss. A GDT 714 corresponds to the GDT 221 and the GDT 254. A TVS diode 715 may correspond to the TVS diode 222 and the TVS diode 255. A TVS diode 716 may correspond to the TVS diode 223 and the TVS diode 256. An earth ground terminal 713 provides a connection point for an earth ground, such as the earth ground 224 and the earth ground 257. A relay diode contact 718 is connected to the TVS diode 715 and a relay diode contact 719 is connected to the TVS 716. A contact slide cam 722 moves a relay contact slide 724.

Figure 7B:
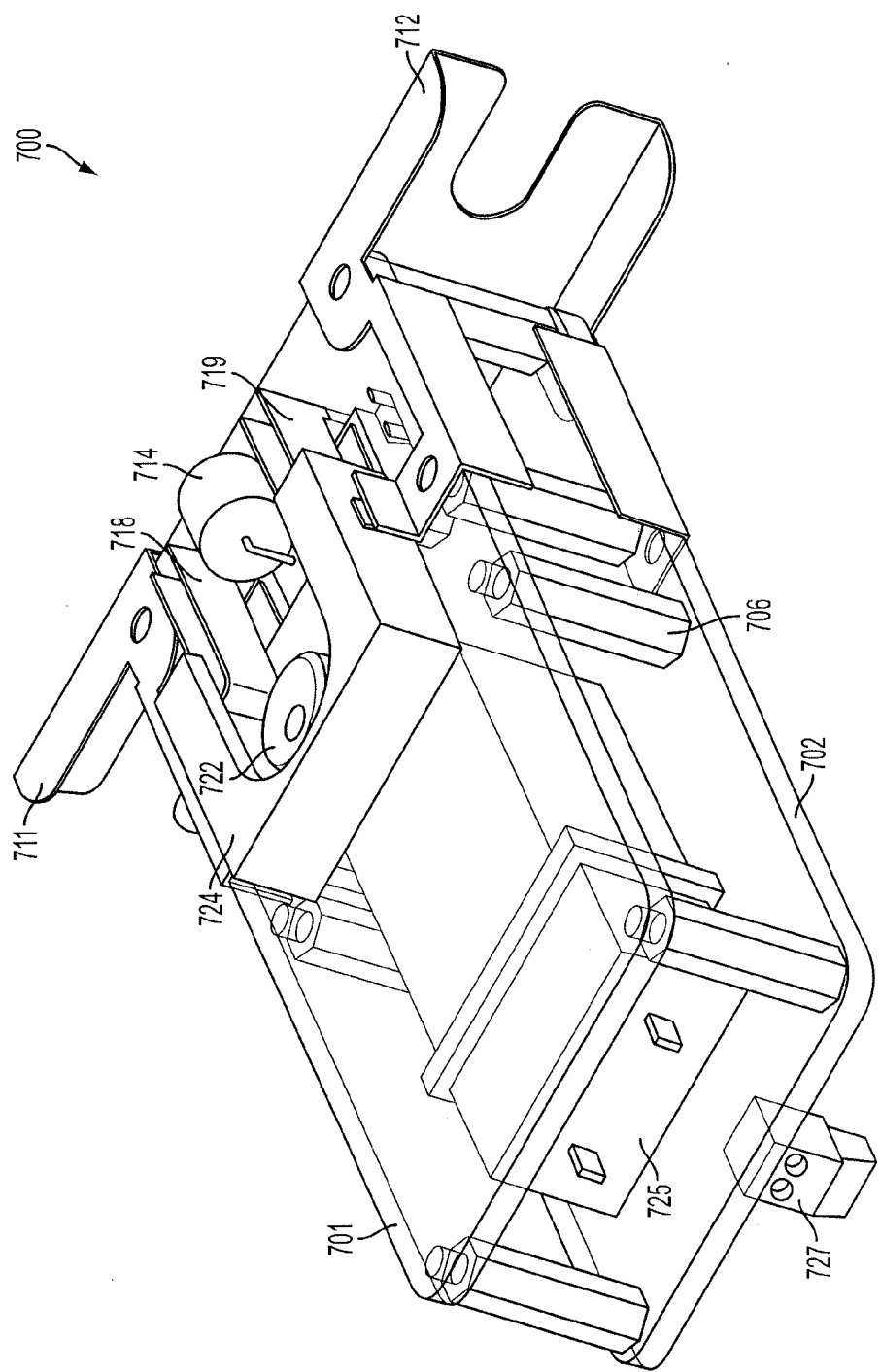
FIG. 7B is an alternate view of the surge voltage protector of FIG. 7A according to an implementation of the present disclosure.

FIG. 7B shows an alternate view of the RSVP 700. A connector 725 corresponds to the connector 576 and is connected to a terminal 727.

Figure 7C:
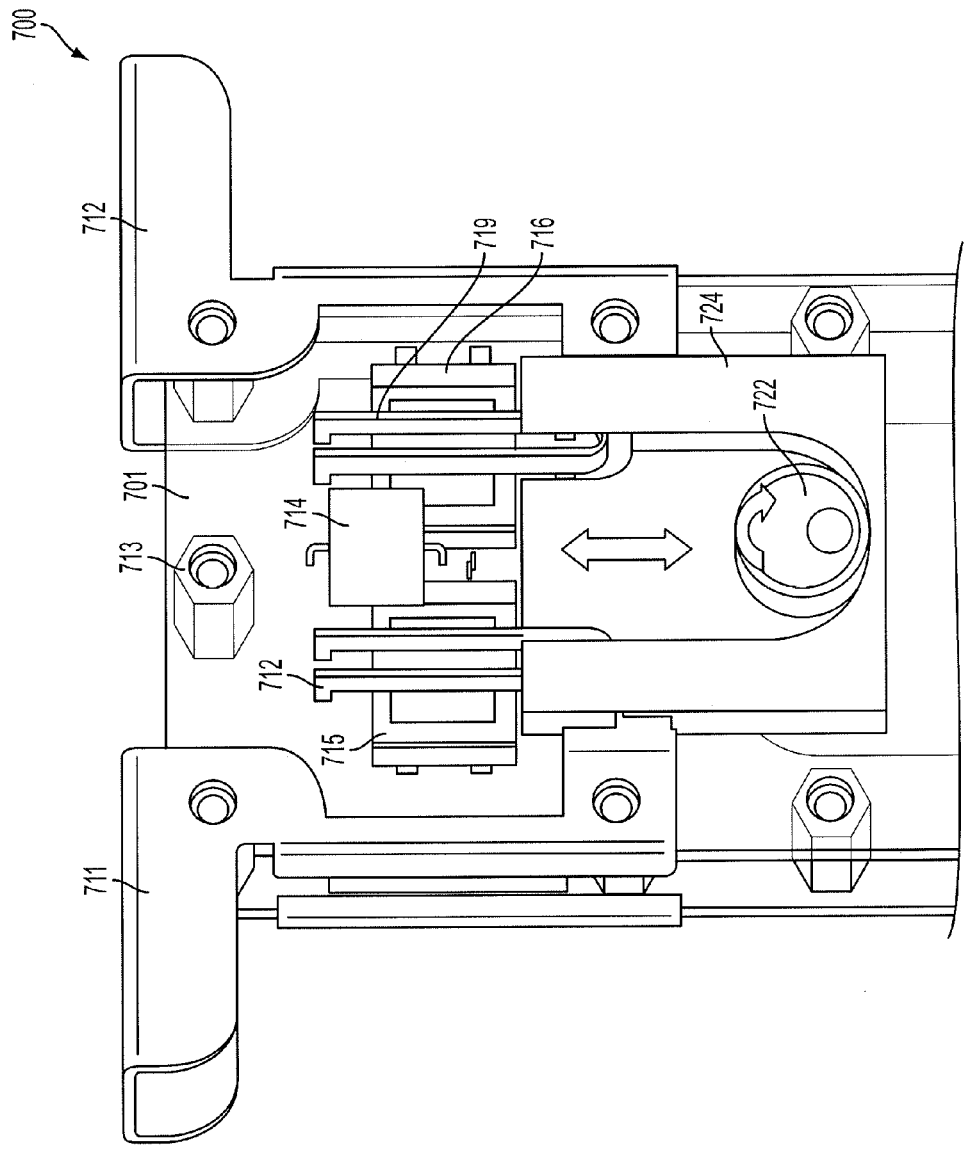
FIG. 7C is an alternate view of the surge voltage protector of FIG. 7A according to an implementation of the present disclosure.
Figure 7D:
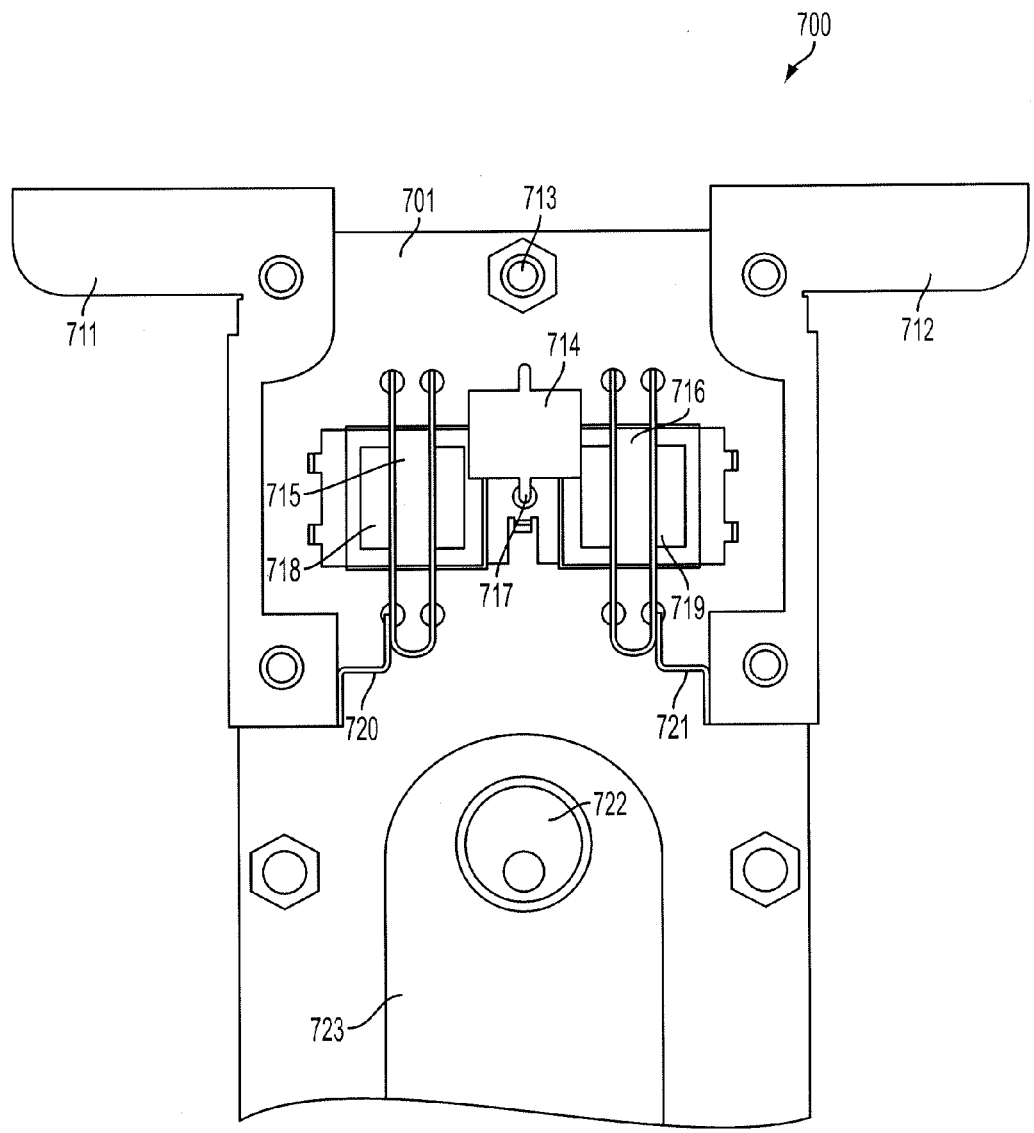
FIG. 7D is an alternate view of the surge voltage protector of FIG. 7A according to an implementation of the present disclosure.
Figure 7E:
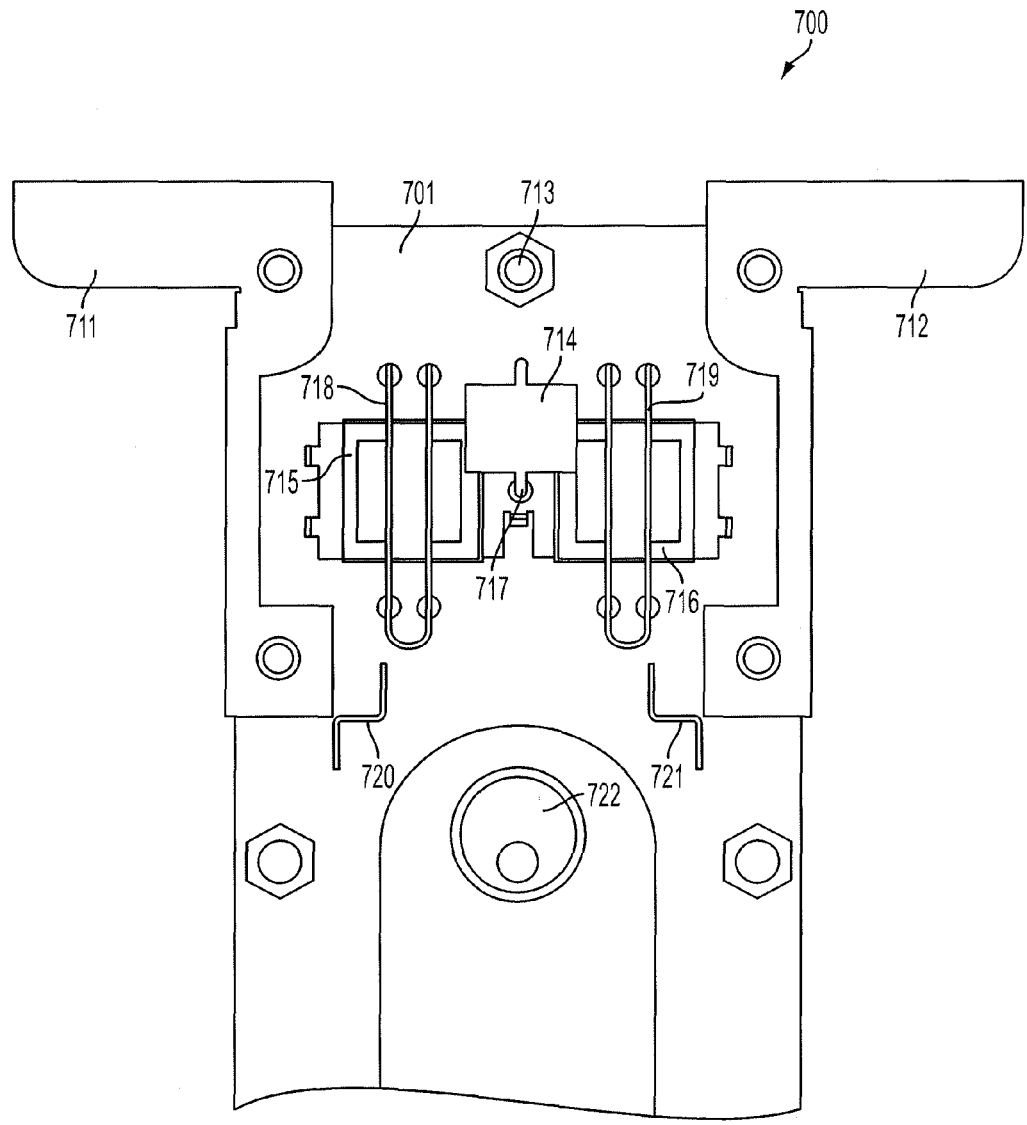
FIG. 7E is an alternate view of the surge voltage protector of FIG. 7A according to an implementation of the present disclosure.

FIGS. 7C-7E illustrate how the contact slide cam 722 functions. In FIGS. 7D and 7E, the relay contact slide 724 is not shown in order to show the gear motor 723, and the relay slide contact 720 and the relay slide contact 721. The relay slide contact 720 is configured to connect to the first rail terminal 711 and the relay slide contact 721 is configured to connect to the second rail terminal 712. A TVS/GDT junction 717 corresponds to the node 280. The contact slide cam 722 rotates from the gear motor 723, which corresponds to the disconnect relay motor 327 and the disconnect relay motor 357. When the contact slide cam 722 rotates, the relay slide contact 721 moves linearly as shown in FIG. 7C. The relay contact slide 724 pushes the relay slide contact 720 and the relay slide contact 721 up, in a connected position in FIG. 7D, or down, in a disconnected position in FIG. 7E. When a surge event is detected by the input/detection stage 201, the gear motor 723, the contact slide cam 722, and the relay slide contact 721 work in conjunction to disconnect the relay slide contact 720 and the relay slide contact 721 from the first rail terminal 711 and the second rail terminal 712, respectively. The relay slide contact 721 may correspond to the switch 211 and the switch 253. However, when a surge event occurs, the heat caused may be great enough to melt contacts and terminals together, for example welding the relay slide contact 720 to the first rail terminal 711 and the relay slide contact 721 to the second rail terminal 712. The gear motor 723 must have enough torque to overcome this possible welding. For example, a 120:1 gear ratio may suffice. Even with the contact slide cam 722, which provides speed at a loss of torque, such as 3:1, the gear ratio may be 40:1, which may be sufficient. The gear motor 723 may only need to move a half revolution from a closed (connected) position to an open (disconnected) position. The gear motor 723 may further be chosen to reduce cost while providing sufficient torque.

Figure 7F:
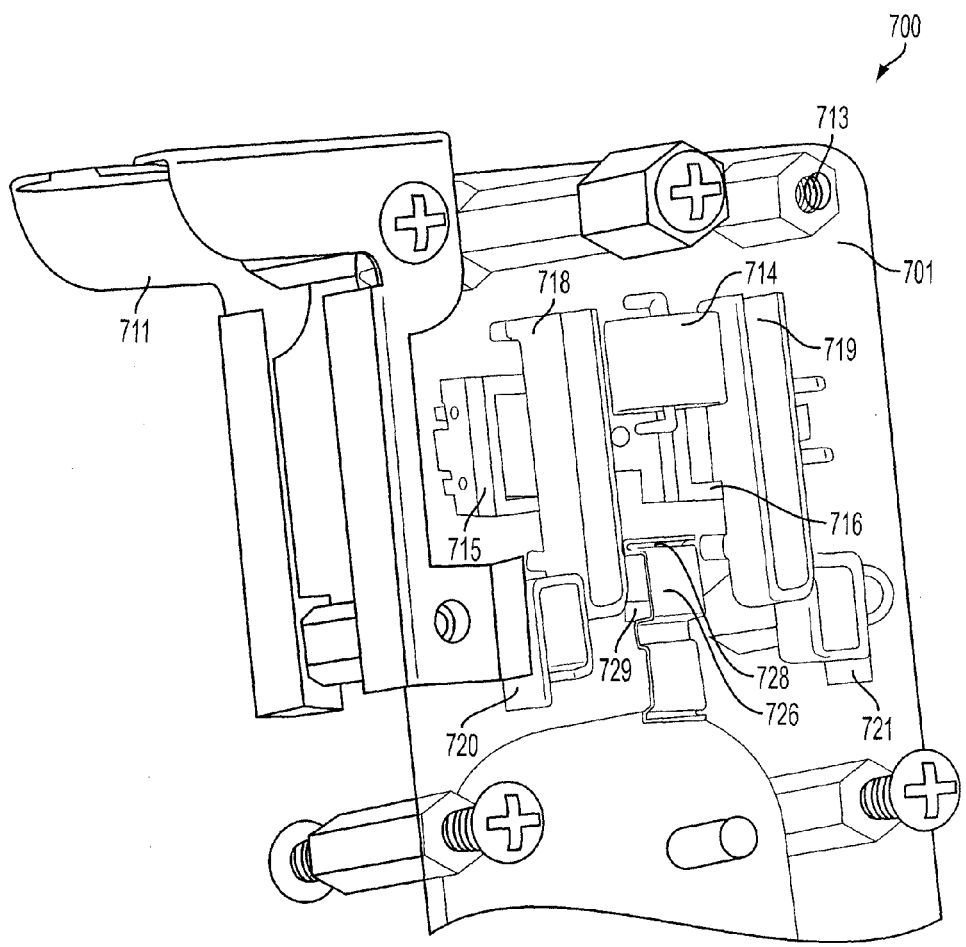
FIG. 7F is an alternate view of the surge voltage protector of FIG. 7A according to an implementation of the present disclosure.

FIG. 7F further shows a switch 726, which corresponds to the switch 326. The switch 726 is a position switch which is normally closed, providing a return path of the gear motor 723. When the gear motor 723 is activated and moves the relay slide contact 720 and the relay slide contact 721 beyond a predetermined point, the switch 726 is mechanically opened to stop current from flowing to the gear motor 723 in order to shut off the gear motor 723. In FIG. 7F, the switch 726 is a bent spring metal contact connected to PCB traces. When the relay contact slide 724 moves beyond the predetermined point, a bent portion of the switch 726 falls into an opening 729 to disconnect power to the gear motor 723. In other implementations, other switching or detection devices may be used.

FIG. 8A depicts an implementation of a surge voltage protector 800. The surge voltage protector 800 corresponds to the RSVP 700 and similarly numbered components generally correspond. The surge voltage protector 800 is enclosed in a front cover 803 and a back cover 804. A first terminal 811 and a second terminal 812, which may correspond to the first rail terminal 711 and the second rail terminal 712, respectively, are exposed for connecting to rails or other signal terminals. Three LEDs 829, which may correspond to the LED 330 in FIG. 3B, the LED 457 and the LED 458 in FIG. 4, are also exposed. One LED 829 may be a visual operating indicator indicating the circuit is OK, or that no imbalances or shorts have been detected. For example, the LED 829 may be a green LED. The other LEDs may be alarm indicators, such as red LEDs, which indicate that a surge event occurred. The LEDs 829 may be configured to flash or blink.

FIG. 8B shows an exploded view of the surge voltage protector 800. A first PCB 801, which corresponds to the trigger PCB 701, and a second PCB 802, which corresponds to the power supply PCB 702, are separated by standoffs 806, which correspond to the standoff 706. The first PCB 801 and the second PCB 802 are attached to the front cover 803 and the back cover 804 through screws 805. The first terminal 811 and the second terminal 812 are also attached to the first PCB 801 and the second PCB 802. A switch 826, which corresponds to the switch 726, a relay slide contact 820, which corresponds to the relay slide contact 720, and a relay slide contact 821, which corresponds to the relay slide contact 721, are covered by a relay contact slide 824, which corresponds to the relay contact slide 724. A contact slide cam 822, which corresponds to the contact slide cam 722, works in conjunction with a motor 828, which corresponds to the gear motor 723, to connect or disconnect the relay slide contact 820 and the relay slide contact 821 from respectively a relay diode contact 818, which corresponds to the relay diode contact 718, and a relay diode contact 819, which corresponds to the relay diode contact 819. The surge voltage protector 800 also includes surge discharge component 814, which may correspond to the GDT 714, and a couple terminals 827, which corresponds to the terminal 727. The two terminals 827, which may provide parallel input/outputs (I/O), may allow for daisy chaining.

Exemplary implementations of the present disclosure have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such implementations that reasonably fall within the scope of the advancement to the art hereby contributed, and that that scope shall not be restricted, except in light of the appended claims and their equivalents.

What is claimed is:

1. A surge protector comprising:
   a first terminal configured to transmit a signal, the signal operating within a normal range;
   a second terminal configured to transmit the signal;
   a surge protection stage connected to the first and second terminals;
   a short detection stage connected to the surge protection stage and configured to detect an imbalance in the signal when the signal is outside the normal range;
   an electromechanical device configured to disconnect the first and second terminals from the surge protection stage; and
   a trigger stage connected to the short detection stage and the electromechanical device and configured to actuate the electromechanical device when the short detection stage detects the imbalance in the signal.

2. The surge protection circuit of claim 1, further comprising an alarm stage connected to the trigger stage and configured to activate an alarm when the trigger stage is activated.

3. The surge protection circuit of claim 2, wherein the alarm comprises an audible alarm.

4. The surge protection circuit of claim 2, wherein the alarm comprises a visual alarm.

5. The surge protection circuit of claim 2, wherein the alarm stage further comprises a remote status circuit.

6. The surge protection circuit of claim 5, wherein the remote status circuit comprises at least one of a dry relay contact circuit, an internet data circuit, and a radio frequency (RF) transmission circuit.

7. The surge protection circuit of claim 1, wherein the surge protection stage further comprises a transient-voltage-suppression (TVS) diode.

8. The surge protection circuit of claim 1, wherein the surge protection stage further comprises at least one of a gas discharge tube (GDT), a diode, and a metal-oxide varistor (MOV).

9. The surge protection circuit of claim 1, wherein the short detection stage further comprises a balanced bridge.

10. The surge protection circuit of claim 1, wherein the trigger stage further comprises a latch.

11. The surge protection circuit of claim 1, wherein the trigger stage further comprises an opto-coupler.

12. The surge protection circuit of claim 1, wherein the trigger stage further comprises a switch configured to disable the electromechanical device.

13. The surge protection circuit of claim 1, wherein the electromechanical device comprises a motor.

14. The surge protection circuit of claim 13, further comprising a first slide contact configured to connect to the first terminal, and a second slide contact configured to connect to the second terminal, wherein the motor is configured to move the first and second slide contacts to disconnect the first and second terminals from the surge protection stage.

15. The surge protection circuit of claim 14, wherein the motor is capable of moving the first and second slide contacts to overcome the first and second slide contacts from welding to the first and second terminals, respectively, during a surge event on the first and second terminals.

16. A surge protector comprising:
- a first terminal configured to transmit a signal, the signal operating within a normal range;
- a second terminal configured to transmit the signal;
- a surge protection stage connected to the first and second terminals and including a transient-voltage-suppression (TVS) diode and a gas discharge tube (GDT);
- a short detection stage connected to the surge protection stage, including a balanced bridge, and configured to detect an imbalance in the signal when the signal is outside the normal range;
- an electromechanical device configured to disconnect the first and second terminals from the surge protection stage;
- a trigger stage connected to the short detection stage and the electromechanical device, including a latch and an opto-coupler, and configured to actuate the electromechanical device when the short detection stage detects the imbalance in the signal;
- a visual operating indicator configured to indicate no imbalance detected in the signal; and
- an alarm stage connected to the trigger stage and configured to activate an alarm when the trigger stage is activated.

17. The surge protector of claim 16, further comprising a first slide contact configured to connect to the first terminal, and a second slide contact configured to connect to the second terminal, wherein the electromechanical device is configured to move the first and second slide contacts to disconnect the first and second terminals from the surge protection stage.

18. The surge protector of claim 17, wherein the electromechanical device comprises a motor capable of moving the first and second slide contacts to overcome the first and second slide contacts from welding to the first and second terminals, respectively, during a surge event on the first and second terminals.

19. The surge protector of claim 16, wherein the trigger stage further comprises a switch configured to disable the electromechanical device.

20. The surge protector of claim 16, wherein the alarm comprises a visual alarm.

* * * * *